(12) United States Patent
Wigren et al.

(10) Patent No.: US 10,701,650 B2
(45) Date of Patent: Jun. 30, 2020

(54) CENTRALIZED MULTI-NODE FLOW CONTROL FOR 5G MULTI-CONNECTIVITY

(71) Applicant: Telefonaktiebolaget LM Ericsson (publ), Stockholm (SE)

(72) Inventors: Torbjörn Wigren, Uppsala (SE); Ramon Alejandro Delgado Pulgar, Elermore Vale (AU); Katrina Lau, Wallsend (AU); Richard Middleton, North Lambton (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/084,695

(22) PCT Filed: Mar. 22, 2016

(86) PCT No.: PCT/EP2016/056213
§ 371 (c)(1),
(2) Date: Sep. 13, 2018

(87) PCT Pub. No.: WO2017/162270
PCT Pub. Date: Sep. 28, 2017

(65) Prior Publication Data
US 2019/0053181 A1 Feb. 14, 2019

(51) Int. Cl.
*H04W 28/02* (2009.01)
*H04L 5/00* (2006.01)
(Continued)

(52) U.S. Cl.
CPC ........ *H04W 56/0015* (2013.01); *G06F 17/16* (2013.01); *H04B 7/024* (2013.01); *H04W 24/10* (2013.01); *H04W 56/0055* (2013.01)

(58) Field of Classification Search
CPC ............ H04L 7/0012; H04W 56/0055; H04W 56/0015; H04W 56/001; H04B 7/0632
(Continued)

(56) References Cited

U.S. PATENT DOCUMENTS

| | | | |
|---|---|---|---|
| 7,325,211 B1 * | 1/2008 | Bistry | G06F 17/5031 716/108 |
| 8,001,204 B2 * | 8/2011 | Burtner | H04L 51/00 709/202 |

(Continued)

FOREIGN PATENT DOCUMENTS

| | | | |
|---|---|---|---|
| EP | 2800429 A1 * | 11/2014 | |
| EP | 2800429 A1 | 11/2014 | |

(Continued)

OTHER PUBLICATIONS

Data Flow Delay Equalization for Feedback Control Applications Using 5G Wireless Dual Connectivity Torbjorn Wigren, Richard Middleton; Kattina Lau; Jun. 4-7, 2017 (Year: 2017).*
(Continued)

*Primary Examiner* — Asad M Nawaz
*Assistant Examiner* — Jason A Harley
(74) *Attorney, Agent, or Firm* — Coats & Bennett, PLLC

(57) ABSTRACT

A multi-point transmission system comprising a plurality of slave nodes (300) for transmitting data to a wireless receiver is described herein. An outer feedback loop and a plurality of inner feedback loops (100) connecting the plurality of slave nodes (300) to a master node (200) controls the timing skew of each slave node (300) using measurements provided by the slave nodes (300) to substantially synchronize the receipt of the transmitted data at the wireless receiver. In so doing, the solution presented herein provides improved multi-point control for any number of transmission points,
(Continued)

which improves capacity, and solves the potential flow control problems associated with ultra-lean transmissions.

30 Claims, 14 Drawing Sheets

(51) Int. Cl.
    *H04W 56/00*     (2009.01)
    *G06F 1/08*     (2006.01)
    *H04B 7/024*     (2017.01)
    *G06F 17/16*     (2006.01)
    *H04W 24/10*     (2009.01)

(58) Field of Classification Search
    USPC .......................... 370/350; 713/400; 327/151
    See application file for complete search history.

(56) References Cited

U.S. PATENT DOCUMENTS

| | | | |
|---|---|---|---|
| 2010/0222068 A1* | 9/2010 | Gaal | H04W 56/0045 455/450 |
| 2012/0307704 A1 | 12/2012 | Roman et al. | |
| 2018/0220474 A1* | 8/2018 | Laselva | H04W 28/08 |

FOREIGN PATENT DOCUMENTS

| | | | | |
|---|---|---|---|---|
| EP | 2822334 A1 | | 1/2015 | |
| GB | 2321829 A | * | 8/1998 | ............... H04B 7/26 |
| GB | 2321829 A | | 8/1998 | |
| WO | 2011075867 A1 | | 6/2011 | |
| WO | 2013167647 A1 | | 11/2013 | |
| WO | 2014207494 A1 | | 12/2014 | |
| WO | 2016021903 A1 | | 2/2016 | |
| WO | 2016144223 A1 | | 9/2016 | |
| WO | 2017222435 A1 | | 12/2017 | |

OTHER PUBLICATIONS

Sandberd, D. et al., "Multi-rate Uplink Channel Prediction and Enhanced Link Adaptation for VoLTE", 2015 IEEE 82nd Vehicular Technology Conference (VTC2015-Fall), Sep. 6-9 Sep. 6, 2015, pp. 1-5, IEEE.

Wigren, T. et al., "Robust L2 Stable Networked Control of Wireless Packet Queues in Delayed Internet Connections", Article in IEEE Transactions on Control Systems Technology, vol. 24, No. 2, Mar. 1, 2016, pp. 502-513, IEEE.

* cited by examiner

CENTRALIZED MULTI-NODE FLOW CONTROL FOR 5G MULTI-CONNECTIVITY

TECHNICAL FIELD

The solution presented herein relates generally to multi-node flow control, and more particularly to controlling the timing of the transmission of data by multiple nodes so as to minimize the timing skew between the timing paths as experienced by the receiver receiving the transmitted data.

BACKGROUND

Wireless systems have conventionally been designed to efficiently handle the transfer of data between a single network node, e.g., base station, and a single terminal, e.g., user equipment (UE), for standard communication frequencies, e.g., 1-2 GHz. The need for higher capacity, however, is resulting in a shift to higher carrier frequencies and/or transmissions by multiple network nodes, which is generally referred to as multi-point transmission.

The shift to higher carrier frequencies typically reduces the useful power experienced by the receiver. In particular, higher radio frequencies cause the radio propagation to transform from a diffuse scattering to a more beamlike propagation. The resulting sharp diffraction effects and increased radio shadowing (e.g., behind obstacles) makes it more difficult to achieve uniform coverage from a single base station. Multi-point transmissions, where data is transmitted from multiple non-co-located transmission points to a receiver, e.g., from multiple base stations to a single mobile station, may be used to provide more uniform coverage. Such multi-point transmissions may be used for various wireless systems, e.g., 4G and 5G systems.

Conventional multi-point systems typically involve a small number of transmission points, e.g., two transmission points. However, the higher frequencies and higher capacity requirements of newer systems are expected to require a large number of transmission points. Conventional systems and solutions, however, are unable to sufficiently control the synchronization errors, particularly those too large to be handled by existing protocols, and/or the large numbers of transmission points expected with such large multi-point systems. Thus, there remains a need for new ways to control multi-point systems.

SUMMARY

The solution presented herein controls the transmission timing of data from multiple transmission points to synchronize the data reception at a receiver. In so doing, the solution presented herein provides improved multi-point control for any number of transmission points, which improves capacity, and solves the potential flow control problems associated with ultra-lean transmissions.

One exemplary embodiment comprises a method implemented in a master node of controlling a transmission timing for a first slave node and a plurality of second slave nodes in a communication network. The method comprises obtaining a first delay from the first slave node, and for each of the plurality of second slave nodes, obtaining a second delay from the corresponding second slave node. The first delay represents a transmission time between the master node and the first slave node, and each of the second delays represents a transmission time between the master node and the corresponding second slave node. The method further comprises subtracting the obtained first delay from each of the obtained second delays to determine a skew timing for each of the second slave nodes. Further, the method comprises determining a first reference value using a setpoint timing error, and for each of the second slave nodes, determining a second reference value using a difference between the corresponding skew timing and a reference skew timing. The method further comprises controlling the first delay using the first reference value, and controlling each of the second delays using the corresponding second reference value.

Another exemplary embodiment comprises a master node in communication with a first slave node and a plurality of second slave nodes of a communication network. The master node comprises an interface circuit/module, a first combiner circuit/module, and an outer loop control circuit/module. The interface circuit/module is configured to obtain a first delay from the first slave node, and for each of the plurality of second slave nodes, obtain a second delay from the corresponding second slave node. The first delay represents a transmission time between the master node and the first slave node, and each of said second delays represents a transmission time between the master node and the corresponding second slave node. The first combiner circuit/module is configured to subtract the obtained first delay from each of the obtained second delays to determine a skew timing for each of the second slave nodes. The outer loop control circuit/module is configured to determine a first reference value using a setpoint timing error, and for each of the second slave nodes, determine a second reference value using a difference between the corresponding skew timing and a reference skew timing. The outer loop control circuit/module is further configured to control the first delay using the first reference value, and control each of the second delays using the corresponding second reference value.

Another exemplary embodiment comprises a computer program product stored in a non-transitory computer readable medium for controlling a master node in communication with a first slave node and a plurality of second slave nodes. The computer program product comprises software instructions which, when run on a processing circuit in the master node, causes the processing circuit to obtain a first delay from the first slave node and, for each of the plurality of second slave nodes, obtain a second delay from the corresponding second slave node. The first delay represents a transmission time between the master node and the first slave node, and each of the second delays represents a transmission time between the master node and the corresponding second slave node. The software instructions, when run on the processing circuit in the master node, further cause the processing circuit to subtract the obtained first delay from each of the obtained second delays to determine a skew timing for each of the second slave nodes. The software instructions, when run on the processing circuit in the master node, further cause the processing circuit to determine a first reference value using a setpoint timing error, and for each of the second slave nodes, determine a second reference value using a difference between the corresponding skew timing and a reference skew timing. The software instructions, when run on the processing circuit in the master node, further cause the processing circuit to control the first delay using the first reference value, and control each of the second delays using the corresponding second reference value.

Another exemplary embodiment comprises a method implemented in a slave node in communication with a master node in a communication network. The method comprises receiving data with a rate set by a data rate control signal, and storing the received data in a transmit queue. The data rate control signal is derived by the master node responsive to a reference value determined by the master node. The method further comprises generating a backhaul delay from detected time-stamped data and the reception of said time-stamped data, and estimating a queue delay for controlling the reference value responsive to the data rate control signal. The queue delay represents the amount of time the received data is stored in the transmit queue. The method further comprises combining the backhaul delay and the queue delay to generate a slave node delay. The method further comprises controlling the data rate control signal by providing the queue delay to the master node via a first interface and providing the slave node delay to the master node via a second interface.

Another exemplary embodiment comprises a slave node in communication with a master node in a communication network. The slave node comprises an interface circuit/module, a transmit queue, a processor circuit/module, and a combiner circuit/module. The interface circuit/module is configured to receive data with a rate set by a data rate control signal, and the transmit queue is configured to store the received data. The data rate control signal is derived by the master node responsive to a reference value determined by the master node. The processor circuit/module is configured to generate a backhaul delay from detected time-stamped data and the reception of said time-stamped data, and estimate a queue delay for controlling the reference value responsive to the data rate control signal. The queue delay represents the amount of time the received data is stored in the transmit queue. The combiner circuit/module is configured to combine the backhaul delay and the queue delay to generate a slave node delay. The slave node is configured to control the data rate control signal by providing the queue delay to the master node via a first interface and by providing the slave node delay to the master node via a second interface.

Another exemplary embodiment comprises a computer program product stored in a non-transitory computer readable medium for controlling a slave node in communication with a master node. The computer program product comprises software instructions which, when run on a processing circuit in the slave node, causes the processing circuit to receive data with a rate set by a data rate control signal, and store the received data in a transmit queue. The data rate control signal is derived by the master node responsive to a reference value determined by the master node. The software instructions, when run on the processing circuit in the master node, further cause the processing circuit to generate a backhaul delay from detected time-stamped data and the reception of said time-stamped data, and estimate a queue delay for controlling the reference value responsive to the data rate control signal, the queue delay representing the amount of time the received data is stored in the transmit queue. The software instructions, when run on the processing circuit in the master node, further cause the processing circuit to combine the backhaul delay and the queue delay to generate a slave node delay, and to control the data rate control signal by providing the queue delay to the master node via a first interface and providing the slave node delay to the master node via a second interface.

DETAILED DESCRIPTION

The solution presented herein solves numerous problems associated with the synchronization of data transmitted in multi-point transmission systems, particularly those with a large number of transmission points. Before the details of this solution are described, the following first provides some basic information regarding multi-point transmissions and the associated systems.

In massive multi-point transmission systems, such as those expected for 5G systems, where a receiver receives data transmitted by a large number of transmission points, each involved transmission point needs to be given access to all or portions of this data, for transmission over the wireless interface. It should here be noted that the different transmission points may transmit different data, the same data for diversity gain, or a mix of these alternatives. In many applications data from some transmission points may be closely related to data simultaneously being transmitted from other transmission points, e.g., when the data is video data. In this case, the receiving device, e.g., the UE, needs to receive all of the data transmitted from different transmission points for a specific part of the video at the same time (e.g., to within a certain pre-determined margin of error).

Note also that 5G technology includes the concept of ultra-lean transmission. As such, user data carries, in a piggy backed fashion, control channel data and system information. For this reason continuous transmission is often needed to keep a multi-point transmission path active.

Figure 1:
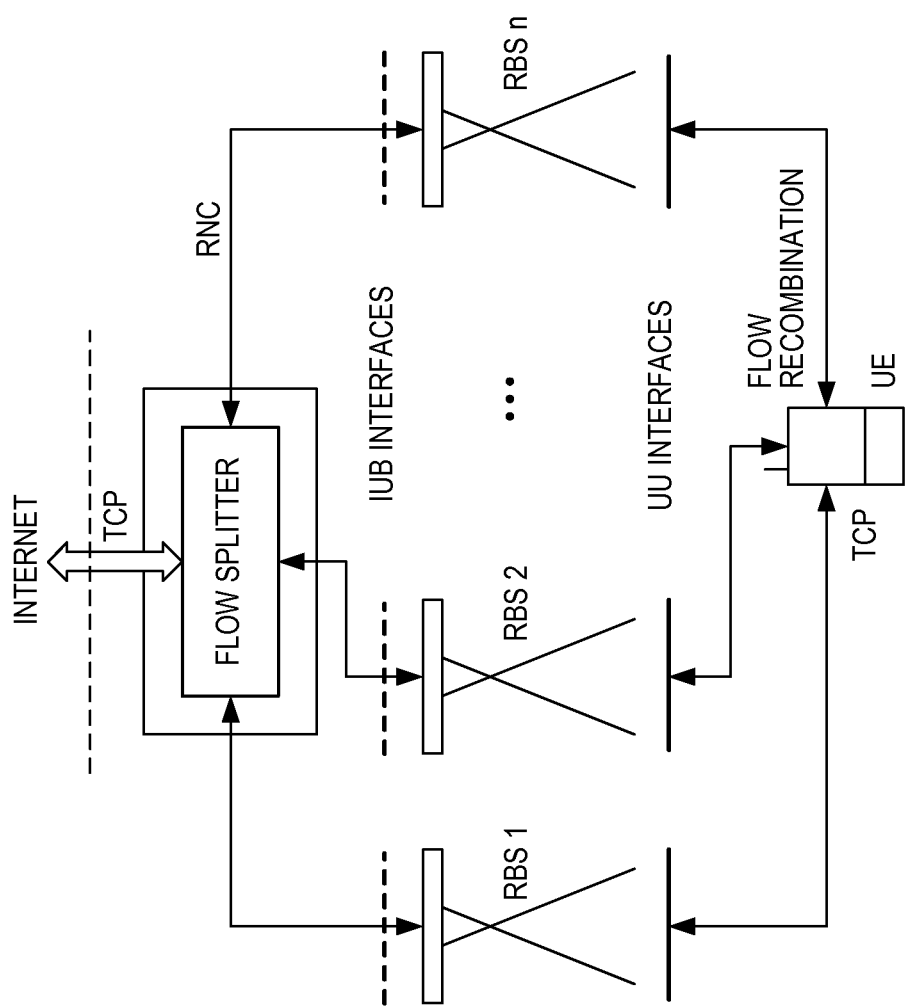
FIG. 1 shows an exemplary multi-point transmission system.

FIG. 1 shows an exemplary multi-point transmission system in terms of a 3G Wideband Code Division Multiple Access (WCDMA) system. Similar architectures in 4G and 5G could involve nodes from both the radio access network (RAN) and the core network (CN). The following explains the terminology used with respect to the operation of such a multi-point transmission system.

First, a number of representations of a dynamic process is introduced. A dynamic process is one where the output has memory, and therefore depends not only on the present input signal but also on previous inputs and outputs. The most basic dynamic process is a linear one, which may be described by a differential equation as:

$$y^{(N)}(t)+a_1 y^{(N-1)}(t)+\ldots+a_N=b_0 u^{(M)}(t)+\ldots+b_M u(t), \quad (1)$$

where y(t) represents an output signal, u(t) represents an input signal, t represents time, (N) represents $N^{th}$ order differentiation with respect to time, and $a_k$ and $b_l$ represent constant parameters where k=1, ..., N and l=1, ..., M. Equation (1) is an $N^{th}$ order differential equation with one input signal and one output signal. For simplicity, the following explanation stems from this single input, single output equation, but it will be appreciated that the following may easily be extended to multiple inputs and/or multiple outputs by those skilled in the art.

Taking the Laplace transform of Equation (1) and setting initial values to zero produces the following transfer function H(s), where s represents the Laplace transform variable.

$$H(s) = \frac{B(s)}{A(s)} = \frac{b_0 s^M + b_1 s^{M-1} + \ldots + b_M}{s^N + a_1 s^{N-1} + \ldots + a_N} \quad (2)$$

The relationship between the output signal Laplace transform Y(s) and the input signal Laplace transform U(s) is therefore:

$$Y(s)=H(s)U(s), \quad (3)$$

where the poles ($p_k$=1, ..., N) for this process may be given by A(s)=0. For simplicity, only strictly stable (e.g., open loop) processes with all poles in the left half of the complex plane are considered here. In general, however, the poles are real or complex conjugate pairs. It will be appreciated that the properties of the dynamic process may also be studied in the frequency domain in terms of complex valued frequency functions Y(jω), H(jω), and U(jω), where ω represents the angular frequency that fulfills ω=2πf, and where f represents the frequency in Hz.

Figure 2:
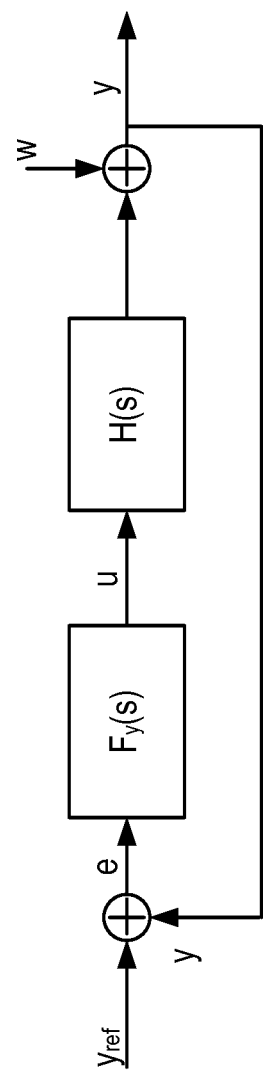
FIG. 2 shows a general block diagram for a closed-loop control system.

FIG. 2 shows a general block diagram for a closed-loop control system associated with Equation (3). In FIG. 2, $F_y(s)$ represents a feedback gain and W(s) represents a disturbance, e.g., noise. The closed-loop system may then be represented by:

$$Y(s)=W(s)+H(s)F_y(s)(Y_{ref}(s)-Y(s)), \quad (4)$$

which results in:

$$Y(s) = \frac{F_y(s)H(s)}{1 + F_y(s)H(s)} Y_{ref}(s) + \frac{1}{1 + F_y(s)H(s)} W(s). \quad (2)$$

Equation (5) shows the effect of the reference signal $Y_{ref}(s)$ and the disturbance W(s) on the output. The closed-loop bandwidth $\omega_{CL}$ of the control system may be represented by:

$$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2. \quad (3)$$

The closed-loop static error of the control system may be given by:

$$y_{ref} - y = \frac{1}{1 + F_y(0)H(0)} (y_{ref} - w). \quad (4)$$

The static disturbance rejection of the control system may be given by the static sensitivity function:

$$S(0) = \frac{1}{1 + F_y(0)H(0)}, \quad (5)$$

while the dynamic disturbance rejection of the control system may be given by the sensitivity function:

$$S(j\omega) = \frac{1}{1 + F_y(j\omega)H(j\omega)}. \quad (6)$$

The complementary sensitivity function of the control system, T(jω)=1−S(jω), determines the robustness of the control system with respect to un-modeled dynamics.

It will be appreciated that the discussion associated with FIGS. 1-2 and Equations (1)-(9) correspond to one transmission point of a multi-transmission point system, and the control of such a transmission point. It will be appreciated that the control of multi-transmission point systems increases in complexity as the number of transmission points increases.

One concern with multi-point transmission systems involves the synchronization of the received data at the receiver, e.g., at the UE. For example, in a best case scenario, the data received by the flow splitter of FIG. 1 will be an ordered set of packets that must be transmitted to the UE. Due to non-uniform and widely varying delays in the individual flows, the packets received by the UE will generally be out of order. Exemplary causes for such delay variations may include, but are not limited to, varying queueing delays in the base station, varying transport network delays (e.g., due to congestion), varying radio link quality (causing, e.g., different buffer sizes in different base stations), and/or the existence (or lack thereof) of retransmissions. It will be appreciated that because higher carrier frequencies, such as expected for 5G systems, result in an increased radio shadowing, handling such radio link variations becomes increasingly important for such systems high carrier frequency systems.

Current multi-point transmission systems automatically handle small timing errors, e.g., by reordering the packets, to synchronize the received data. In some cases, however, the timing error is too large, and thus such reordering techniques are not sufficient. When the conventional reordering techniques are insufficient, conventional systems may register an error and request a retransmission of one or more packets. Such retransmission requests may cause the retransmission of out-of-sequence packets that have already been received, as well as the retransmission of packets still in flight. Such retransmission requests may therefore cause significant errors, and further aggravate the already problematic timing issues.

Another concern with multi-point transmission systems is the expected increase in the number of users, and thus the amount of data, for 5G systems as compared to current 4G systems. This large increase means the number of controller algorithm instances, such as described by Equations (1)-(9), will also increase dramatically. Such an increase could undesirably impact the complexity of the overall control system used to control the multi-point transmission system.

Yet another concern is that certain types of applications for 5G systems, e.g., robotic control over wireless, requires significantly less latency as compared to the current 4G systems. As a result, in order to time align data at the UE, the faster transmit paths need to wait for the slower ones, which means the worst connection path would be allowed to dominate the better ones, a fact that is not advantageous for capacity, stability, and performance in general.

Still another concern involves the ultra-lean transmission of 5G systems, which requires some sort of continuous transmission over all desired transmission paths to provide signaling of the necessary control information continuously. If some sort of continuous transmission is not maintained over all of the transmission paths, the multi-point wireless transmission path that is subject to data starvation would become inactive, due to a potential loss of critical control states, e.g., channel state information and/or synchronization.

For at least these reasons, it is clear that new solutions for multi-point transmission systems are needed.

The solution presented herein provides control for a multi-point transmission system to synchronize data reception at the UE for any number of transmission points and to simplify the controller without negatively impacting the ultra-lean transmission of 5G systems. To that end, the solution presented herein controls the transmit timing skew of multiple transmit nodes so that the transmit timing skew falls within pre-specified limits. To simplify the discussion, the following describes the solution presented herein in terms of multiple transmit nodes comprising a master node and a plurality of slave nodes. While the terms "master" node and "slave" node as used herein can represent those nodes traditionally referred to as a master node and a slave node, it will be appreciated by those skilled in the art that, as used herein, the term "master node" represents the entity in the communication network that provides the master control function for the associated slave nodes and the equipment associated with the timing control solution presented herein, and the term "slave node" represents the entity in the communication network that provides the slave control function and equipment associated with the timing control solution presented herein. Thus, while the master node referred to herein may reside in a serving cell base station, such is not required. Further, while each master and slave node may reside in a different network node, it will be appreciated that such is not required. In some embodiments, for example, the master node and at least one slave node may both be comprised in a radio base station. In general, the solution presented herein assumes each slave node represents one transmission point of the multi-point transmission system.

Figure 3:
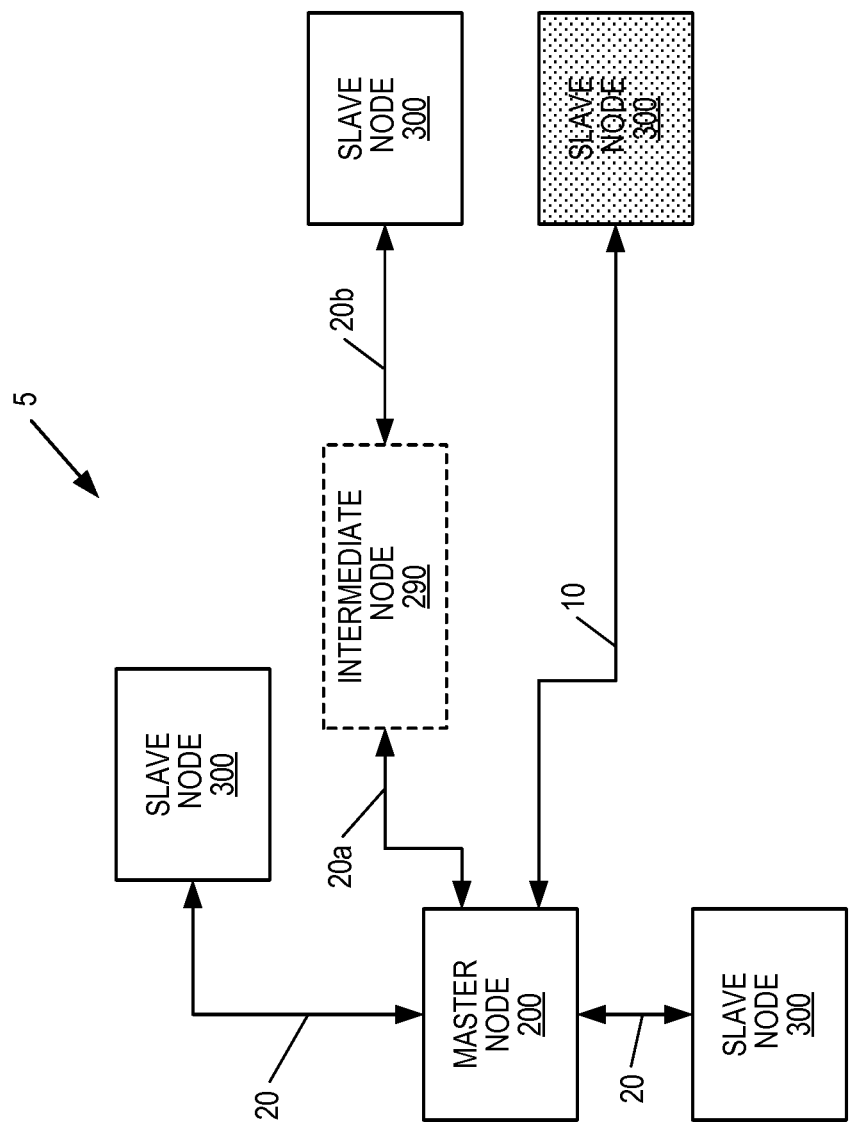
FIG. 3 shows a block diagram for a multi-point transmission system according to one exemplary embodiment.

FIG. 3 shows an exemplary multi-point communication system 5 comprising a master node 200 and a plurality of slave nodes 300, where the shaded slave node 300 represents a reference slave node 300. It will be appreciated that any node designated as a "slave node" may be used as the reference slave node 300. The slave nodes 300 each represent a transmission point of a multi-transmission point system, and thus each slave node 300 transmits wireless data to a wireless receiver (not shown), e.g., a mobile device. The master node 200 communicates with the reference slave node 300 via one communication channel 10, e.g., one backhaul channel, while the master node 200 communicates with the remaining slave nodes 300 via other individual communication channels 20. It will be appreciated that the communication channels 10, 20 between the master node 200 and the slave nodes 300 may comprise wireless and/or wired backhaul communication channels. Further, as shown in FIG. 3, the master 200 may communicate directly with one or more of the slave nodes 300, or may communicate with one or more of the slave nodes 300 via an intermediate node 290, where the communication channel 20a is between the master node 200 and the intermediate node 290 and the communication channel 20b is between the intermediate node 290 and the slave node 300. When an intermediate node 290 is used to facilitate the communications between the master and slave nodes 200, 300, the intermediate node 290 conveys the information discussed further below from the slave node 300 (or from the master node 200) to the master node 200 (or to the slave node 300).

Figure 4:
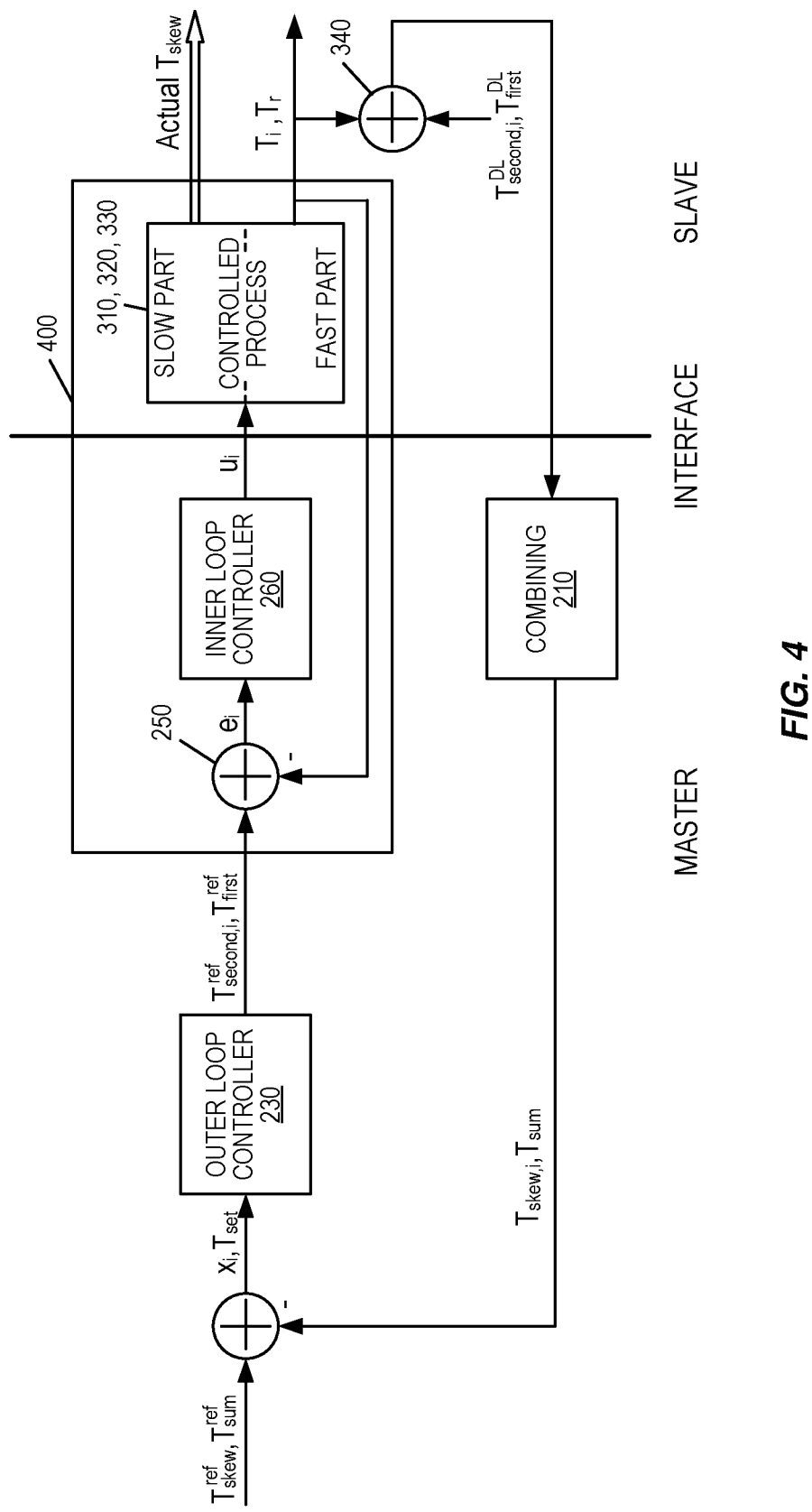
FIG. 4 shows a block diagram for the inner loop control between the master and slave nodes according to one exemplary embodiment.

To substantially synchronize the reception of transmissions from each slave node at a receiver, and thus to address many of the problems associated with conventional multi-point systems, the solution presented herein uses two feedback loops between the master and slave nodes 200, 300: an inner feedback loop and an outer feedback loop, as shown in FIG. 4. The master and slave nodes 200, 300 use these feedback loops to control the timing skew associated with data transmissions from each of the slave nodes 300, as discussed further herein with respect to FIGS. 5-10. Generally speaking, the inner feedback loop 400 provides the actual timing skew and provides measured data to the outer feedback loop, and the outer feedback loop uses the provided measured data to control the actual timing skew of each slave node. As shown in FIG. 4, which shows a general and basic block diagram of the interactions between one master node 200 and one slave node 300, inner loop 400 is part of both the master and slave nodes 200, 300. For example, as shown in FIG. 4, the inner loop 400 comprises a combiner 250 and inner loop controller 260 in the master node 200, and the interface 310, transmit queue 320, and processor 330 of the slave node 300 (FIG. 7). The general control shown by FIG. 4 extends to multiple transmission points as shown in FIG. 7. The inner loop 400 operates according to known means and is provided herein only for completeness. In general, the slave node portion of the inner loop 400 provides cascade control using a slow control process and a fast control process. The slow control process outputs the actual skew timing used by the slave node 300 for data transmission responsive to the inner loop control. The fast control process provides the first and second delays $T_{first}$, $T_{second,i}$ as discussed herein to facilitate the operation of the outer loop and as controlled by the inner loop. It will be appreciated that the inner loop may be represented by the transfer function $G_i^{inner}$, which may be given by:

$$G_i^{inner}(s) = \frac{b_0 s^M + \cdots + b_M}{s^N + \cdots + a_N} \quad (10)$$

where $a_k$ (k=1, . . . , N) and $b_l$ (l=1, . . . , M) represent the coefficients of the transfer function as explained above with respect to Equations (1) and (2), and where s represents the Laplace variable.

Figure 5:
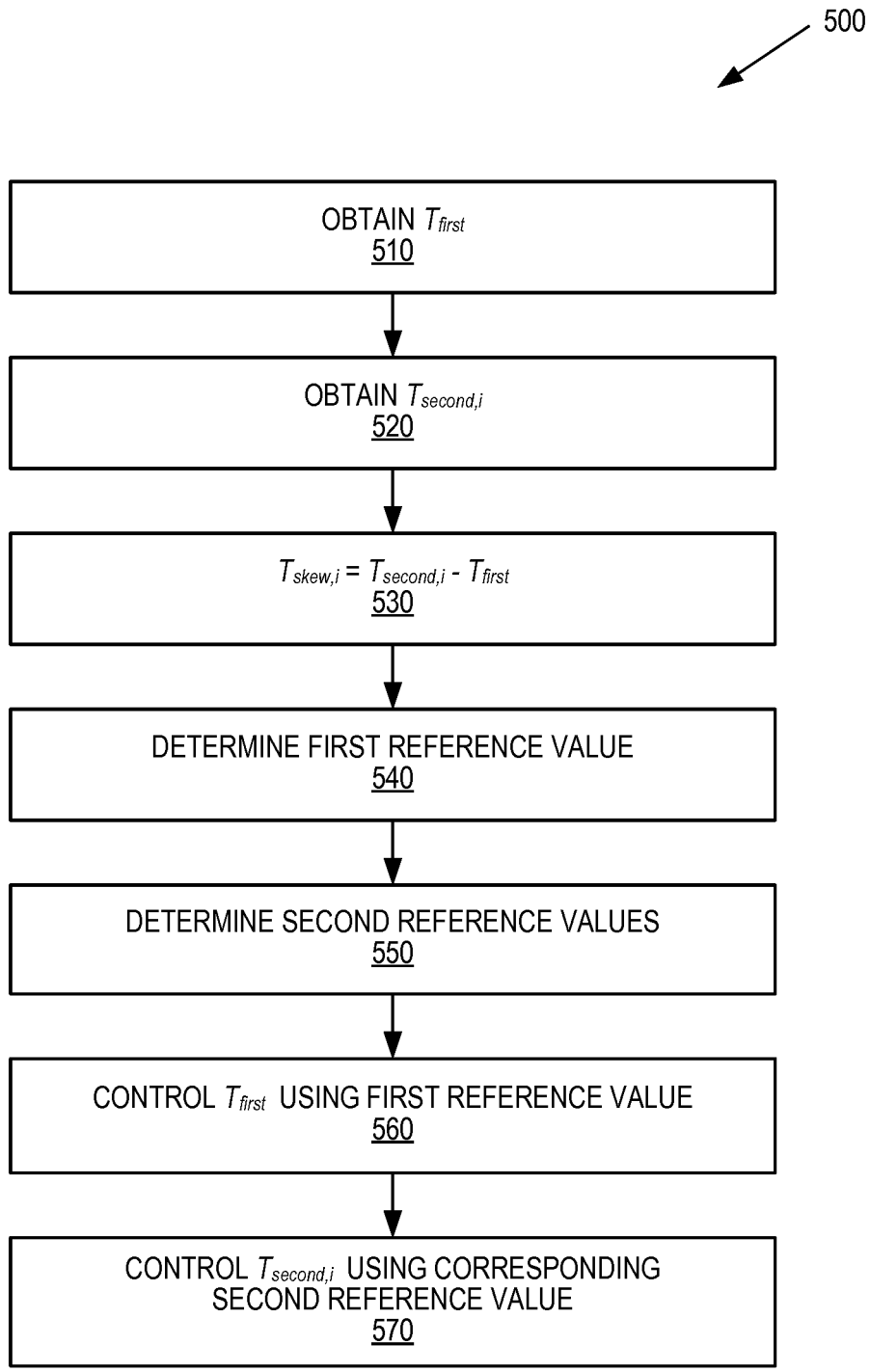
FIG. 5 shows a control method for the master node according to one exemplary embodiment.
Figure 6:
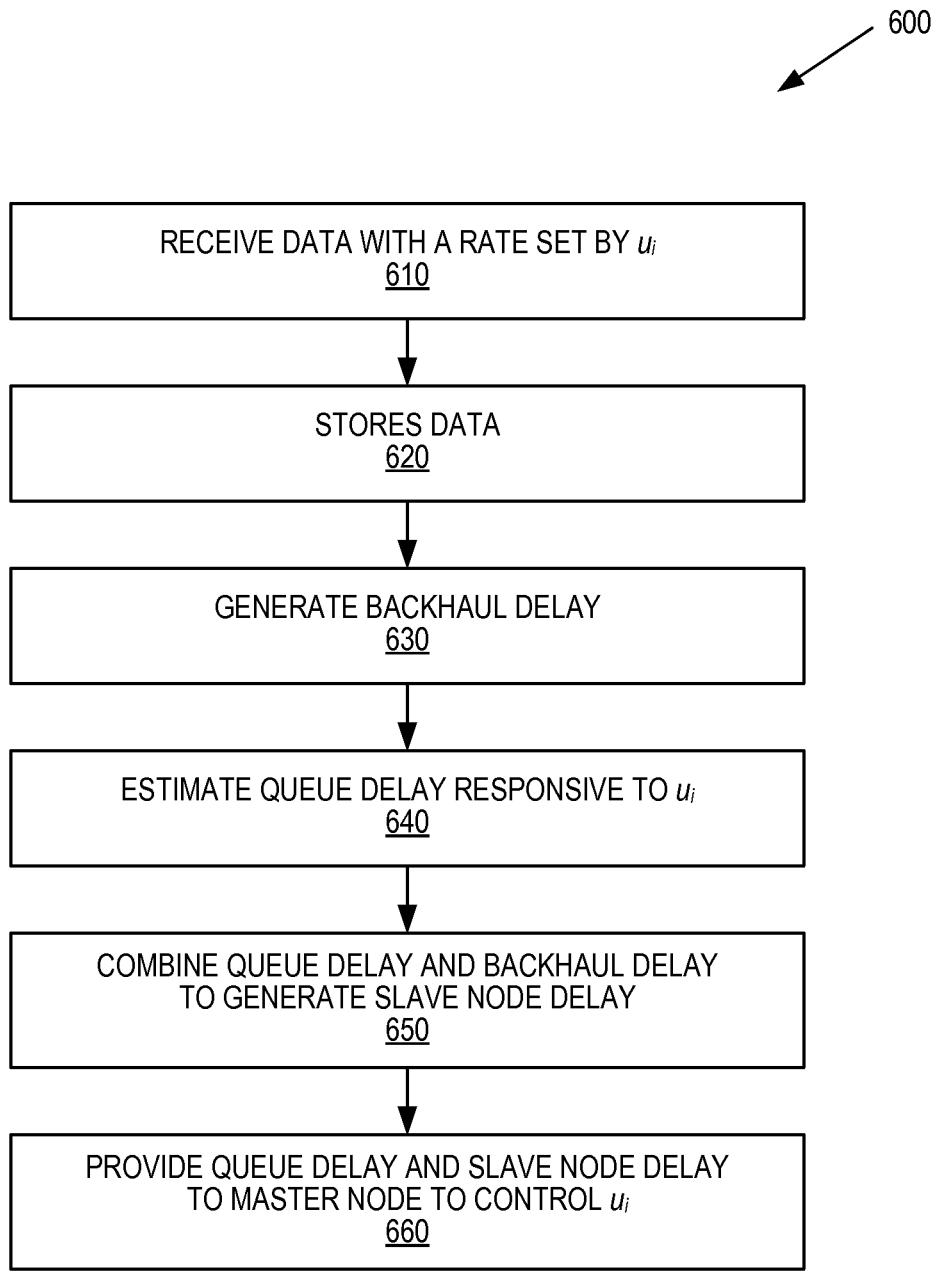
FIG. 6 shows a control method for the slave node according to one exemplary embodiment.
Figure 7:
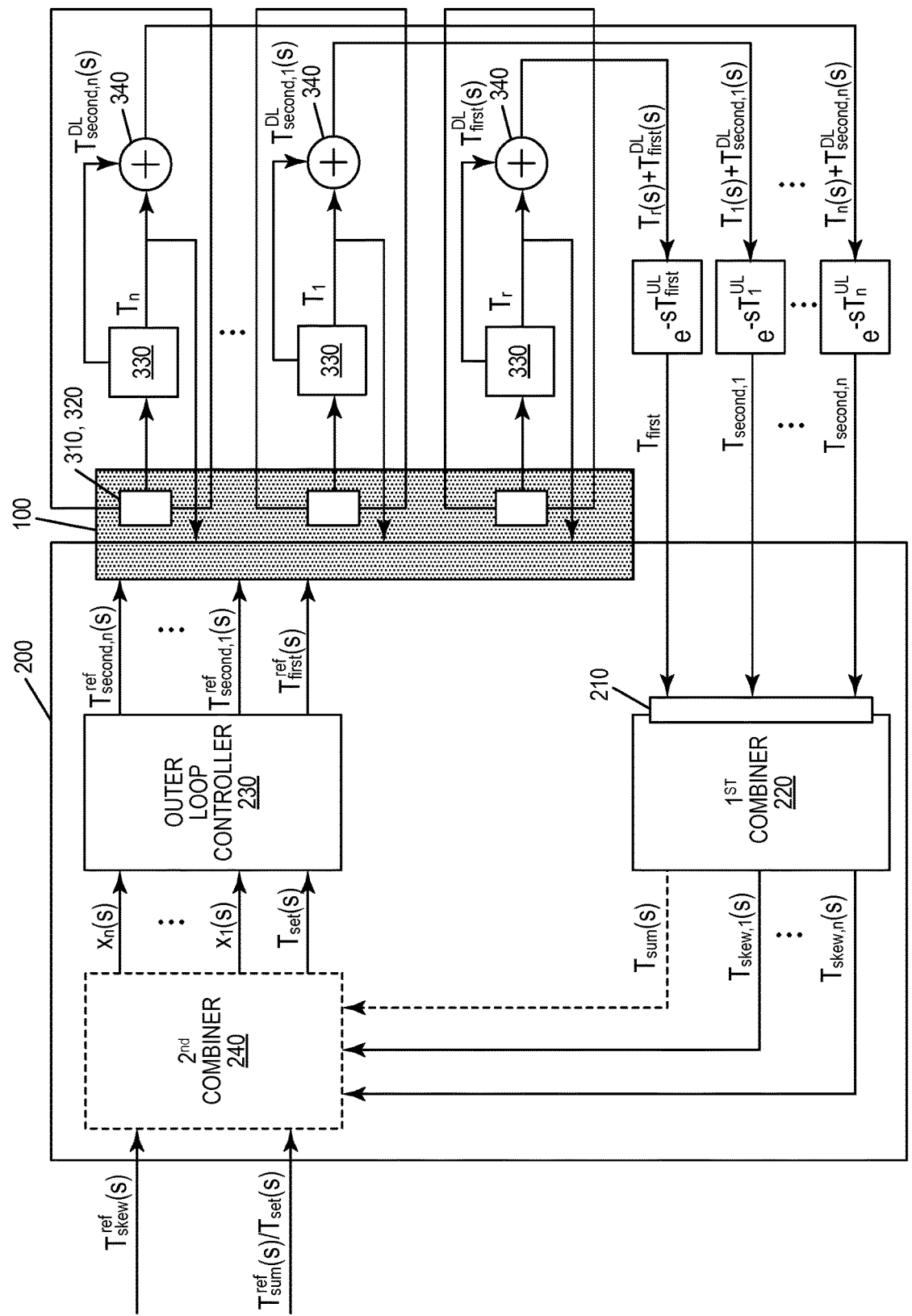
FIG. 7 shows a block diagram for the master and slave nodes of the multi-point transmission system according to one exemplary embodiment.

FIGS. 5 and 6 show exemplary methods 500, 600 respectively implemented by a master node 200 and a slave node 300 according to the solution presented herein. To control the transmission timing for a plurality of slave nodes 300, master node 200 obtains a first delay $T_{first}$ from the a first (e.g., the reference) slave node 300 (block 510), where the first delay $T_{first}$ represents a transmission time between the master node 200 and the reference slave node 300. For each of the i=1, . . . , n remaining (e.g., second) slave nodes 300, the master node 200 obtains a second delay $T_{second,i}$ from the corresponding second slave node 300 (block 520), where each of the second delays $T_{second,i}$ represents a transmission time between the master node 200 and the corresponding second slave node 300. As used herein, each "transmission time" represents the time elapsed from the transmission of data from the master node 200 until the data is ready for wireless transmission from the corresponding slave node 300. Thus, the first delay represents the time elapsed from the transmission of data from the master node 200 until the data is ready for wireless transmission from the reference slave node 300. Similarly, each second delay represents the time elapsed from the transmission of data from the master node 200 until the data is ready for wireless transmission from the corresponding second slave node 300.

Referring back to FIG. 5, the master node 200 subtracts the obtained first delay $T_{first}$ from each of the obtained second delays $T_{second,i}$ to determine a skew timing $T_{skew,i}$ for each of the second slave nodes 300 (block 530), and determines a first reference value $T_{first}^{ref}$ using a setpoint timing error $T_{set}$ (block 540). For each of the second slave nodes 300, the master node 200 determines a second reference value $T_{second,i}^{ref}$ using a difference between the corresponding skew timing $T_{skew,i}$ and a reference skew timing $T_{skew}^{ref}$ (block 550). The master node 200 then controls the first delay $T_{first}$ using the first reference value $T_{first}^{ref}$ (block 560), and controls each of the second delays $T_{second,i}$ using the corresponding second reference value $T_{second,i}^{ref}$ (block 570).

In a complementary method 600, shown in FIG. 6, slave node 300 receives, from the master node 200, data with a data rate set by a data rate control signal $u_i$, where the master node 200 derives the data rate control signal $u_i$ responsive to a reference value $T_i^{ref}$, $T_r^{ref}$ determined by the master node 200 (block 610). The slave node 300 then stores the received data in a transmit queue (block 620). The slave node 300 generates a backhaul delay $T_i^{DL}$, $T_r^{DL}$ from detected time-stamped data and the reception of the time-stamped data (block 630), and estimates a queue delay $T_i$, $T_r$ for controlling against the reference value $T_i^{ref}$, $T_r^{ref}$ responsive to the data rate control signal $u_i$ (block 640). The queue delay $T_i$, $T_r$ represents the amount of time the received data is stored in the transmit queue 320 of the slave node 300. The slave node 300 combines the backhaul delay $T_i^{DL}$, $T_r^{DL}$ and the queue delay $T_i$, $T_r$ to generate a slave node delay $T_i+T_i^{DL}$, $T_r+T_r^{DL}$ (block 650). Slave node 300 affects the data rate control signal $u_i$ by providing the queue delay $T_i$, $T_r$ to the master node 200 via a first interface and providing the slave node delay $T_i+T_i^{DL}$, $T_r+T_r^{DL}$ to the master node 200 via a second interface (block 660).

Figure 8:
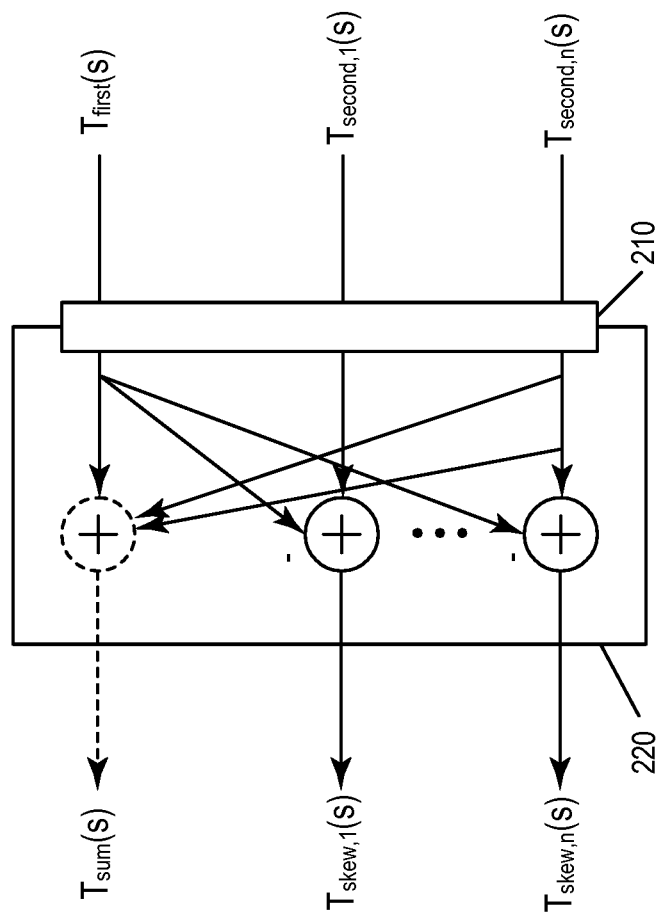
FIG. 8 shows a block diagram for the first combiner of the master node according to one exemplary embodiment.
Figure 9:
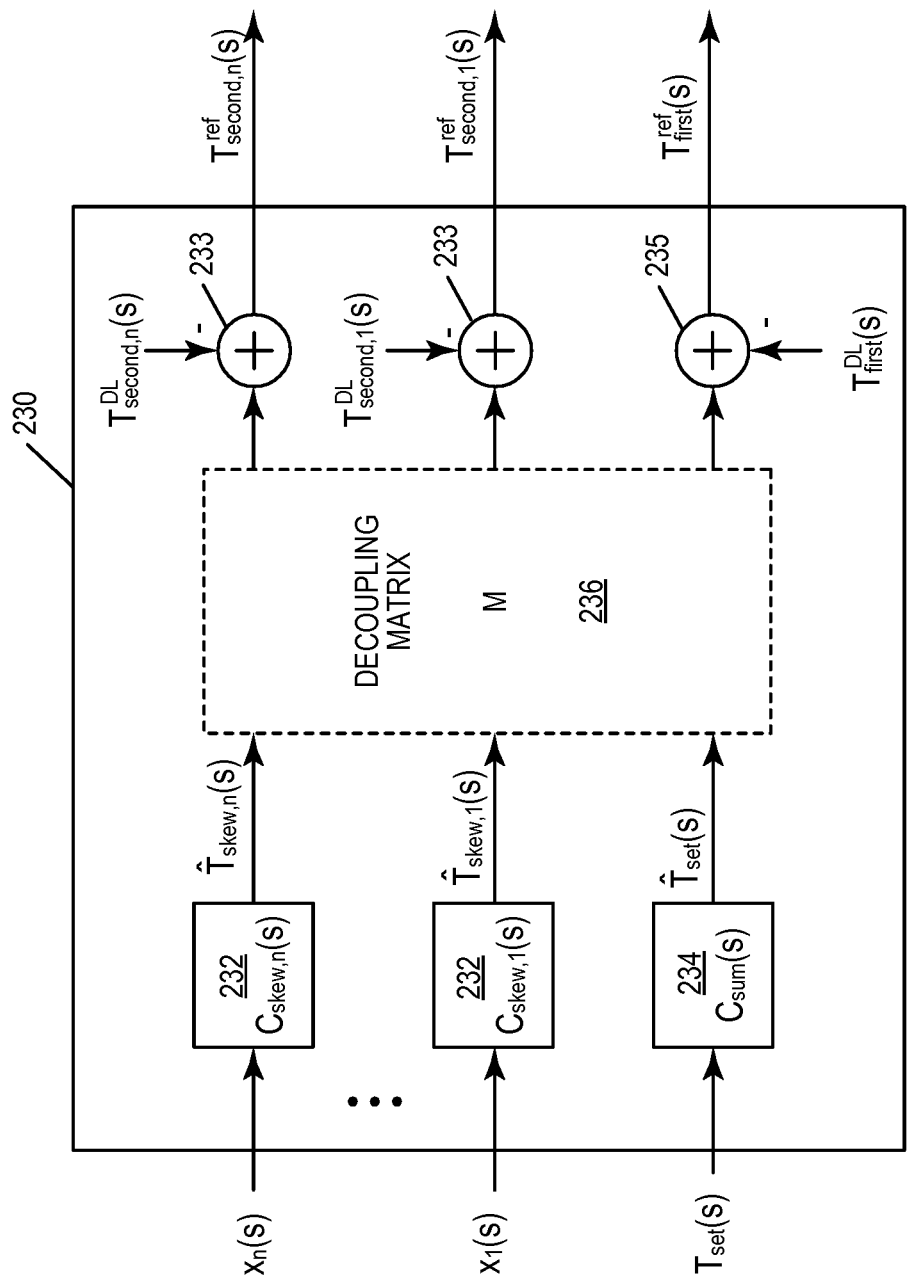
FIG. 9 shows a block diagram for the outer loop controller of the master node according to one exemplary embodiment.
Figure 10:
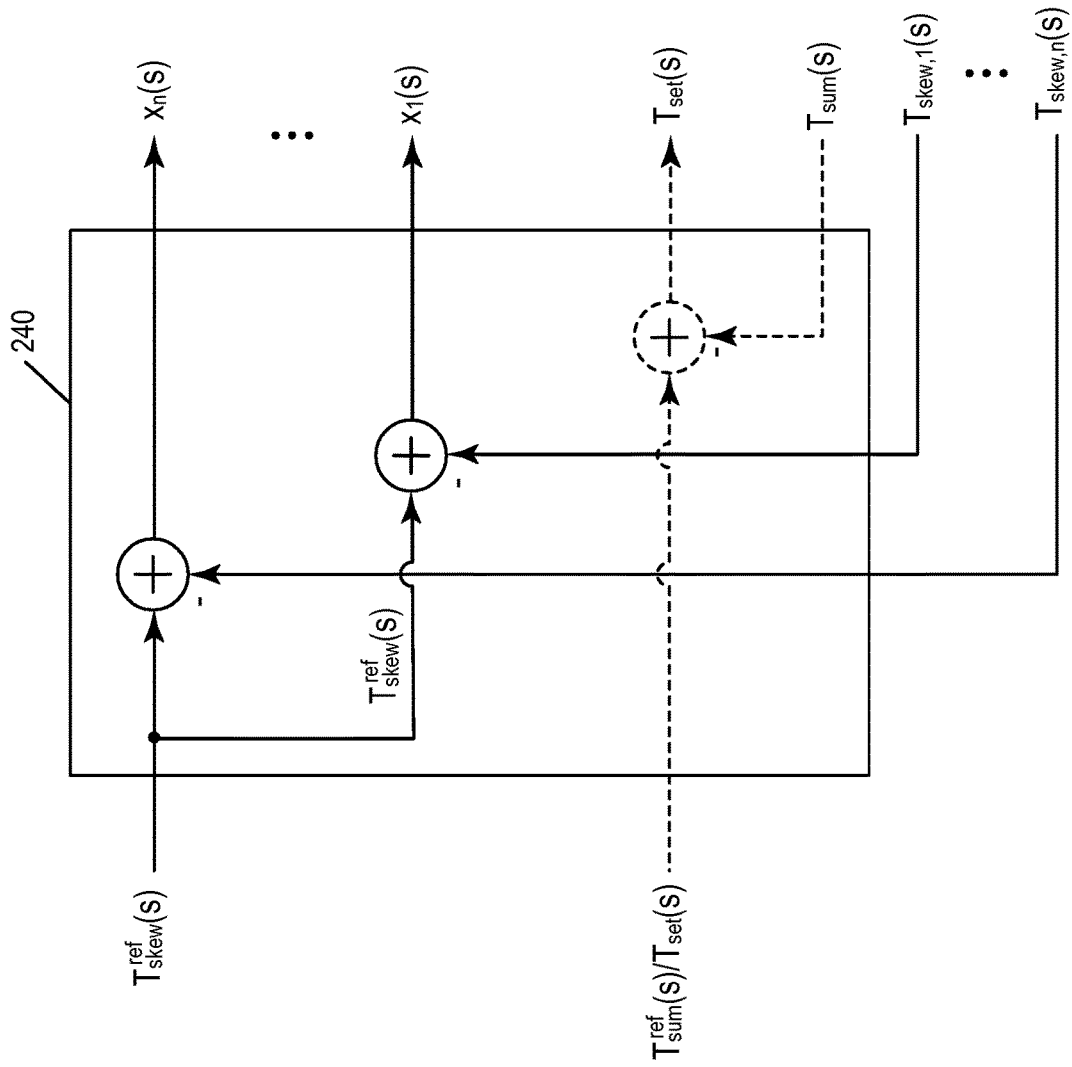
FIG. 10 shows a block diagram for the second combiner of the master node according to one exemplary embodiment.

FIG. 7 shows a general block diagram for the control of a multi-point transmission system comprising the master node 200 and the first and second slave nodes 300 according to the methods 500, 600 of FIGS. 5 and 6. FIGS. 8-10 show more detailed block diagrams of the master node components. The shaded box in FIG. 7 represents the inner loop 400 of the system, which has circuit elements in both the master and slave nodes, as shown in FIG. 4. For simplicity, FIG. 7 shows inner loop 400 essentially as an interface between the master and slave nodes 200, 300. It will be appreciated that one or more elements of the master node 200 and one or more elements of each slave node 300 may be part of the inner loop 400, e.g., as shown in FIG. 4. The solution presented herein introduces the outer feedback loop, where the following describes this system for i=1, . . . , n second transmission points, for one reference transmission point r, and for one bearer. It will be appreciated, however, that one skilled in the art may easily extend the solution presented herein to more than one bearer, where a bearer represents the support for a flow of data packets typically belonging to an IP connection.

The slave nodes 300, including the reference slave node 300, perform the wireless transmissions to the receiver, e.g., the mobile device (not shown). Thus, each slave node 300 represents one transmission point in the multi-point system. As shown in FIG. 7, each slave node 300 includes an interface 310, a transmit queue 320, a processor 330 and a combiner 340. Interface 310 receives data, where the received data has a data rate set by a data rate control signal $u_i$ (FIG. 4) derived by the master node 200 responsive to reference values $T_{first}^{ref}$, $T_{second,i}^{ref}$, where $T_{first}^{ref}$ represents the reference value for the reference slave node 300 and $T_{second,i}^{ref}$ represents the reference value for the i=1, . . . , n remaining (second) slave nodes 300. These reference values are used for control of the inner feedback loop 400. The transmit queue 320, which may be part of interface 310 as shown in FIG. 7 or may comprise a hardware element separate from the interface 310, stores the received data. It will be appreciated that each slave node 300 transmits the data in the transmit queue over a wireless interface, where there typically is one transmit queue for each bearer (e.g., for each IP connection between the data source and the end user). Processor 330 generates a backhaul delay $T_{second,i}^{DL}$, $T_{first}^{DL}$ from detected time-stamped data and the reception of such time-stamped data, where $T_{first}^{DL}$ represents the backhaul delay for the reference slave node 300 and $T_{second,i}^{DL}$ represents the backhaul delay for the i=1, . . . , n remaining (second) slave nodes 300. For example, processor 330 may generate the backhaul delay $T_{second,i}^{DL}$, $T_{first}^{DL}$ by determining the difference between the time of arrival of the time-stamped data and the actual time stamp (provided by the master node 200).

Processor 330 further estimates a queue delay $T_i$, $T_r$ for controlling against the reference values $T_{first}^{ref}$, $T_{second,i}^{ref}$ responsive to the data rate control signal $u_i$ (FIG. 4), where $T_r$ represents the queue delay for the reference slave node 300 and $T_i$ represents the queue delay for the i=1, . . . , n remaining (second) slave nodes 300. As used herein, the queue delay $T_i$, $T_r$ represents the amount of time the received data is stored in the corresponding transmit queue 320. Accordingly, the processor 330 may estimate the queue delay $T_i$, $T_r$ by measuring the time elapsed from when a packet enters the corresponding transmit queue 320 and when it leaves the corresponding transmit queue 320. Alternatively, processor 330 may estimate the queue delay $T_i$, $T_r$ by computing the quotient between the data volume of the corresponding transmit queue 320 and the wireless data rate. In still another alternative, the processor 330 may estimate the queue delay $T_i$, $T_r$ by computing the quotient between the averages of the data volume and the wireless data rate.

A combiner 340 combines the backhaul delay $T_{second,i}^{DL}$, $T_{first}^{DL}$ with the corresponding queue delay $T_i$, $T_r$ to generate a slave node delay $T_i+T_{second,i}^{DL}$, $T_r+T_{first}^{DL}$, where $T_r+T_{first}^{DL}$ represents the slave node delay for the reference slave node 300 and $T_i+T_{second,i}^{DL}$ represents the slave node delay for the i=1, . . . , n remaining slave nodes 300. Each slave node 300 provides its slave node delay $T_i+T_{second,i}^{DL}$, $T_r+T_{first}^{DL}$ to the master node 200, e.g., via a channel interface that may be represented by $e^{-sT_{first}^{UL}}$ for the reference slave node 300 and by $e^{-sT_{second,i}^{UL}}$ for the i=1, . . . , n remaining (second) slave nodes 300. Here, the exponential is the well-known Laplace transform of the underlying interface delay. As a result, the channel interfaces provide a first delay $T_{first}$ from the reference slave node 300 and a second delay $T_{second,i}$ from each of the i=1, ... , n remaining (second) slave nodes 300 to the master node 200, where the first delay $T_{first}$ represents a transmission time between the master node 200 and the reference slave node 300, and each of the second delays $T_{second,i}$ represents a transmission time between the master node 200 and the corresponding one of the i=1, ... , n remaining (second) slave nodes 300. Each slave node 300 also provides its queue delay $T_i$, $T_r$ back to the master node 200, i.e., back to the portion of the inner loop 400 associated with the master node 200 (FIG. 4).

As also shown in FIG. 7, master node 200 includes an interface 210, a first combiner 220, and outer loop controller 230, and an optional second combiner 240. Interface 210 obtains the first delay $T_{first}$ from the reference slave node 300 and obtains the second delays $T_{second,i}$ from each of the i=1, ... , n remaining (second) slave nodes 300. The first combiner 220 subtracts the first delay $T_{first}$ from each of the second delays $T_{second,i}$ to determine a skew timing $T_{skew,i}$ for each of the of the i=1, ... , n slave nodes 300, as shown in FIG. 8. A setpoint timing error $T_{set}$ is input to the outer loop controller 230, as is a difference $x_i$ between a reference skew timing $T_{skew}^{ref}$ and the corresponding skew timing $T_{skew,i}$ for each of the i=1, ... , n second slave nodes 300. As used herein, $T_{skew}^{ref}$ represents the reference value for the time skew, which may be 0 in some cases. Outer loop controller 230 determines a first reference value $T_{first}^{ref}$ using the setpoint timing error $T_{set}$, and determines a second reference value $T_{second,i}^{ref}$ for each of the i=1, ... , n second slave nodes 300 using the difference $x_i$. The outer loop controller 230 then controls the first delay $T_{first}$ obtained from the reference slave node 300 using the first reference value $T_{first}^{ref}$, and controls each of the second delays $T_{second,i}$ obtained from the corresponding second slave node 300 using the corresponding second reference value $T_{second,i}^{ref}$.

In some embodiments, the first combiner 220 may further combine the first and second delays $T_{first}$, $T_{second,i}$ to determine a sum delay $T_{sum}$, as shown in FIG. 8. In this case, the master node 200 may also optionally include a second combiner 240 that not only generates the difference $x_i$ from the reference skew timing $T_{skew}^{ref}$ and the corresponding skew timing $T_{skew,i}$, but also generates the setpoint timing error $T_{set}$ from the sum delay $T_{sum}$ and an input reference sum delay $T_{sum}^{ref}$, as shown in FIG. 10. In this embodiment, $T_{sum}^{ref}$ represents the reference value for the sum of downlink time delays. This reference sum delay $T_{sum}^{ref}$ allows regulation of the absolute latency of all of the paths, and thus addresses the ultra-lean requirements of 5G. For example, the reference sum delay $T_{sum}^{ref}$ may be increased to make sure data is available for transmission over all active links, which enables the system to potentially avoid dropping links in ultra-lean scenarios where control information is piggybacked with the transmission. When the setpoint timing error $T_{set}$ is high enough, e.g., when the reference sum delay $T_{sum}^{ref}$ is high enough, the downlink delays of all links will be larger than the backhaul delays of the links. As a result, the transmit queues will have to add a delay, something that requires a non-zero data volume in all transmit queues.

FIG. 9 shows a block diagram for one exemplary outer loop controller 230 for the master node 200. In this embodiment, the outer loop controller 230 includes a feedback control filter 232 and a corresponding combiner 233, as well as a sum feedback control filter 234 and a corresponding combiner 235. Each feedback control filter 232 is configured to filter the input difference $x_i$ to generate a filtered skew timing $\hat{T}_{skew,i}$ according to a transfer function for the control channel of the corresponding second slave node 300. Similarly, the sum feedback control filter 234 filters the setpoint timing error $T_{set}$ according to a transfer function for the delay sum channel to generate a filtered setpoint timing error $\hat{T}_{set}$. To that end, each feedback control filter 232 filters the input difference $x_i$ using $C_{skew,i}$, while the sum feedback control filter 234 filters the setpoint timing error $T_{set}$ using $C_{sum}$. As noted herein, the outer loop controller 230 uses the setpoint timing error and the corresponding sum feedback control filter to make sure data is available for transmission over all active links, which prevents the potential data starvation problem anticipated with ultra-lean transmissions. The outer loop controller 230 then determines each of the second reference values $T_{second,i}^{ref}$ using the corresponding filtered skew timing $\hat{T}_{skew,i}$, and determines the first reference value $T_{first}^{ref}$ using the filtered setpoint timing error $\hat{T}_{set}$. For example, each combiner 233 may generate the corresponding second reference value $T_{second,i}^{ref}$ by combining the filtered skew timing $\hat{T}_{skew,i}$ with the corresponding backhaul delay $T_{second,i}^{DL}$. It will be appreciated that while in some embodiments the filters 232, 234 comprise linear filters, such is not required. Thus, one or more of the filters 232, 234 may comprise more advanced non-linear filters.

As shown in FIG. 7, each loop that controls the skew timing depends on the skew timings from all other control loops. Such coupling may complicate the controller design and/or reduce performance. To address this, the outer loop controller 230 may optionally include a decoupling circuit/module 236 that applies a decoupling matrix M to the input filtered signals. The decoupling matrix M is configured to decouple the skew timings and reference values, and may be derived from a computation of the sum and skew timings. Consider the following, which represents the matrix relationship between $x_i/T_{set}$ and $T_{skew,i}/T_{sum}$.

$$\begin{pmatrix} T_{sum}(s) \\ T_{skew,1}(s) \\ \vdots \\ T_{skew,n}(s) \end{pmatrix} = FD^{UL}(s)G(s) \left( MC(s) \begin{pmatrix} T_{set}(s) \\ x_1(s) \\ \vdots \\ x_n(s) \end{pmatrix} - D^{DL}(s) \right), \quad (11)$$

where F represents a matrix describing the computation of the sum and skew timings, $D^{UL}$ represents the diagonal matrix of uplink delay operators, $D^{DL}$ represents the vector of Laplace transformed downlink delays (not delay operators), G represents the diagonal matrix of downlink inner loop transfer functions, and C represents the diagonal matrix of controller filters. Neglecting backhaul delays and assuming perfect inner loops, e.g., G(s)=I, where I represents the identity matrix, Equation (11) may be simplified to $$\begin{pmatrix} T_{sum}(s) \\ T_{skew,1}(s) \\ \vdots \\ T_{skew,n}(s) \end{pmatrix} = FMC(s) \begin{pmatrix} T_{set}(s) \\ x_1(s) \\ \vdots \\ x_n(s) \end{pmatrix}. \quad (12)$$

Equation (12) indicates that static disturbance decoupling should exploit the relationship FM=I, and thus that M=F$^{-1}$. Using FIG. 7, it will be appreciated that F may be represented by:

$$F = \begin{pmatrix} 1 & 1 & \cdots & \cdots & 1 \\ -1 & 1 & 0 & \cdots & 0 \\ -1 & 0 & 1 & \ddots & \vdots \\ \vdots & & & \ddots & 0 \\ -1 & 0 & \cdots & 0 & 1 \end{pmatrix} \quad (13)$$

Inverting F therefore produces the decoupling matrix M, which is represented by:

$$M = \frac{1}{n}\begin{pmatrix} 1 & -1 & \cdots & \cdots & -1 \\ 1 & n-1 & -1 & \cdots & -1 \\ 1 & -1 & n-1 & \ddots & \vdots \\ \vdots & & & \ddots & -1 \\ 1 & -1 & \cdots & -1 & n-1 \end{pmatrix} \quad (14)$$

Outer loop controller 230 may therefore apply the decoupling matrix M of Equation (14) to the $x_i$ and $T_{set}$ signals to decouple the sum and skew timings.

Additional embodiments of the solution presented herein may also include signaling messages, e.g., from each slave node 300 to the master node 200 or from the master node 200 to each slave node 300. Such signaling messages may provide an identity number of the corresponding slave node, a first bearer identity number, and a first information element including the corresponding first delay. In some embodiments, the signaling messages may further include a first time tag for measuring another delay, e.g., the uplink delay. For example, an inner loop interface from the master node 200 to the slave nodes 300 may include data items, e.g., packets sent with the data rate $u_i$. The inner loop interface from the master node 200 to at least some slave nodes 300 may also include a time stamp. For example, such an inner loop interface may provide an information element with a data packet with multiple optional fields, where the optional fields may include the time stamp, a bearer ID, a master node ID, and/or a slave node ID, and where the information elements carried over the interface 210 of FIG. 7 comprises the first and second delays $T_{first}$, $T_{second,i}$. The inner loop interface from the slave node 300 to the master node 200 may include, in one embodiment, an information element having one or more optional fields, e.g., for the queue time, bearer ID, slave node ID, wireless rate used for feedforward control and/or computation of a queue time, queue data volume (used for computation of a queue time), and/or master node ID. In one exemplary embodiment of the inner loop interface from the slave node 300 to the master node 200, the information element may include fields for the queue time, bearer ID, slave node ID, and master node ID. In another exemplary embodiment of the inner loop interface from the slave node 300 to the master node 200, the information element may include fields for the queue data volume, wireless rate used for computation of the queue time, bearer ID, slave node ID, and master node ID. For the outer loop signaling, a new interface number may be provided to the master node 200 that specifies the $e^{-sT_{first}^{UL}}$ and $e^{-sT_{second,i}^{UL}}$ interfaces, along with the slave node timing information, bearer ID, slave node ID, and master node ID.

Figure 11:
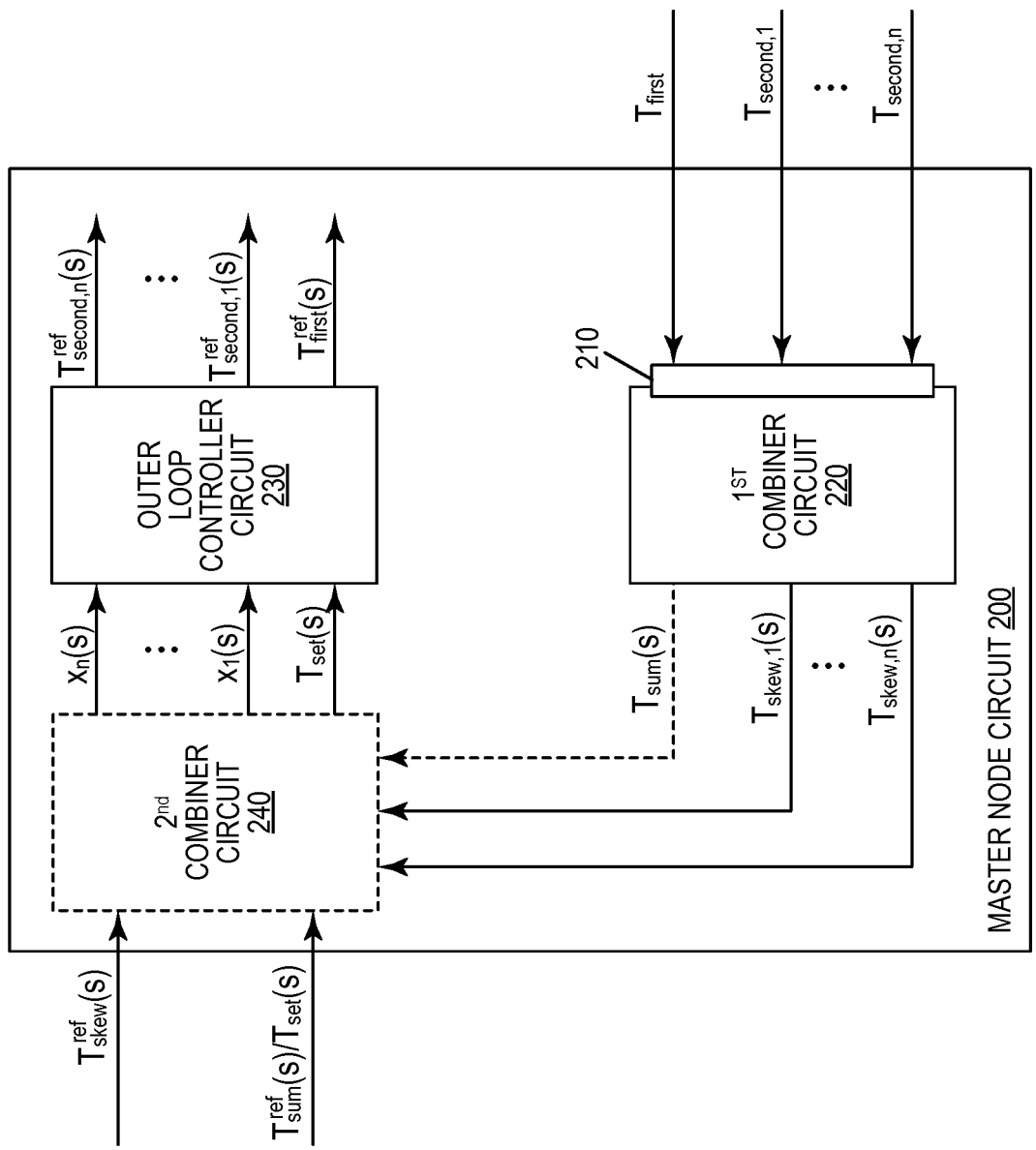
FIG. 11 shows a block diagram for an exemplary master node circuit.
Figure 13:
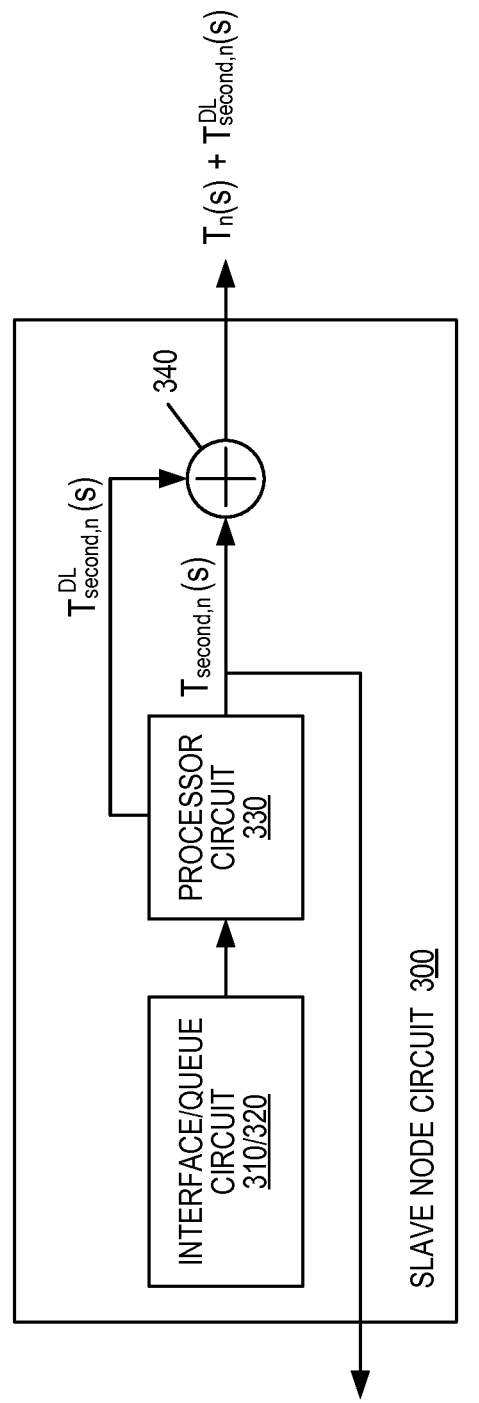
FIG. 13 shows a block diagram for an exemplary slave node circuit.

It will be appreciated that in some embodiments, various elements disclosed herein comprise some kind of circuit. For example, the interface, combiners, outer loop controller, transmit queue, processor, combining matrix, inner loop controller, and/or filter elements of the master and slave nodes 200, 300 may be implemented as, e.g., interface circuits, combiner circuits, outer loop controller circuits, processing circuits, transmit queue circuits, combining matrix circuits, inner loop controller circuits, filter circuits, etc. As such, the master node 200 may comprise a master node circuit 200 comprising an interface circuit 210, a first combiner circuit 220, an outer loop controller circuit 230 (comprising filter circuits 232, 234, combiner circuits 233, 235, and an optional decoupling circuit 236), and an optional second combiner circuit 240, as shown in FIG. 11. Similarly, the slave node(s) 300 of FIG. 7 may comprise a slave node circuit 300 comprising an interface circuit 310, transmit queue circuits 320, processing circuits 330, and combining circuits 340, as shown in FIG. 13. Each of these circuits may be embodied in hardware and/or in software (including firmware, resident software, microcode, etc.) executed on a controller or processor, including an application specific integrated circuit (ASIC).

Figure 12:
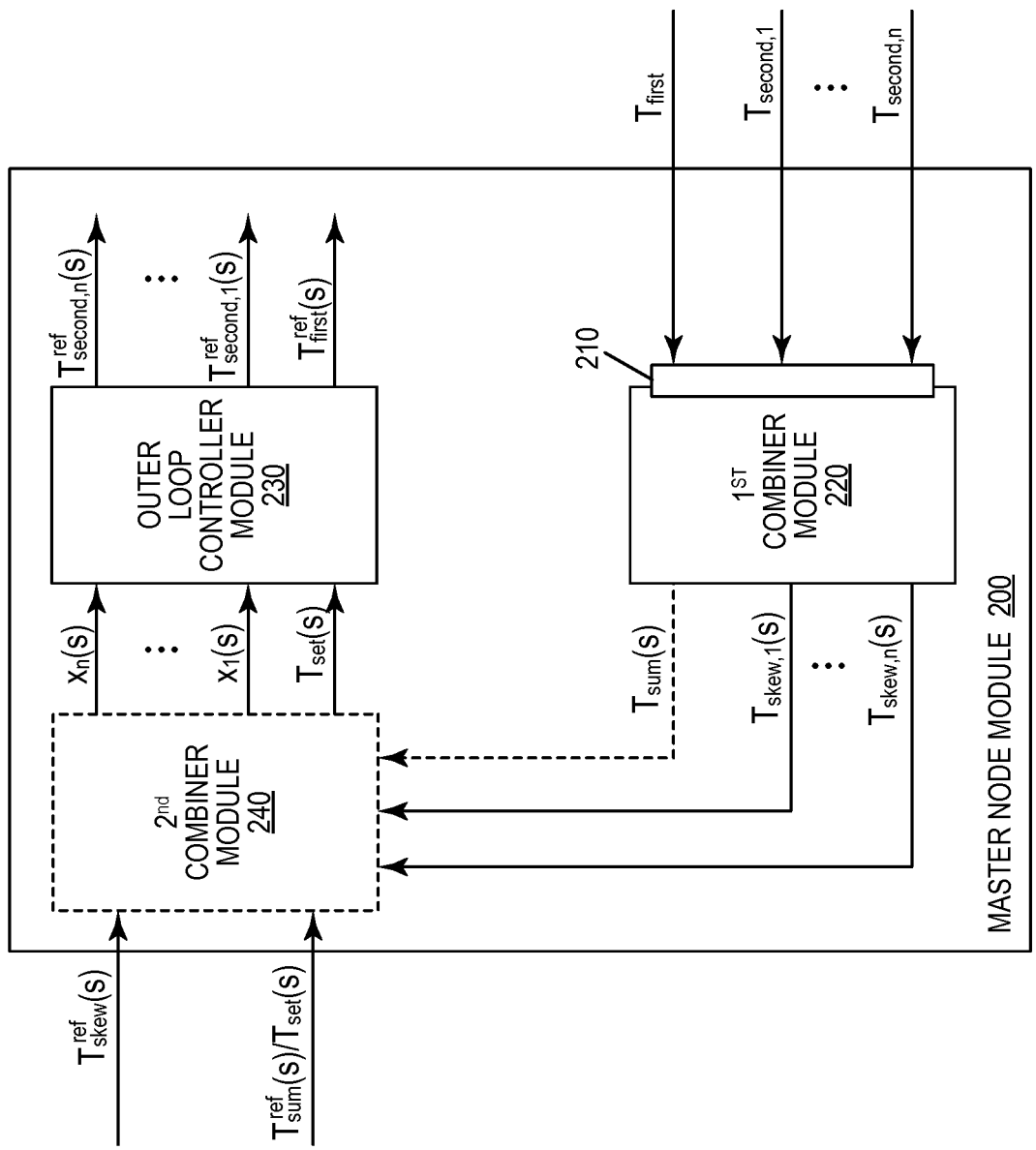
FIG. 12 shows a block diagram for an exemplary master node module.
Figure 14:
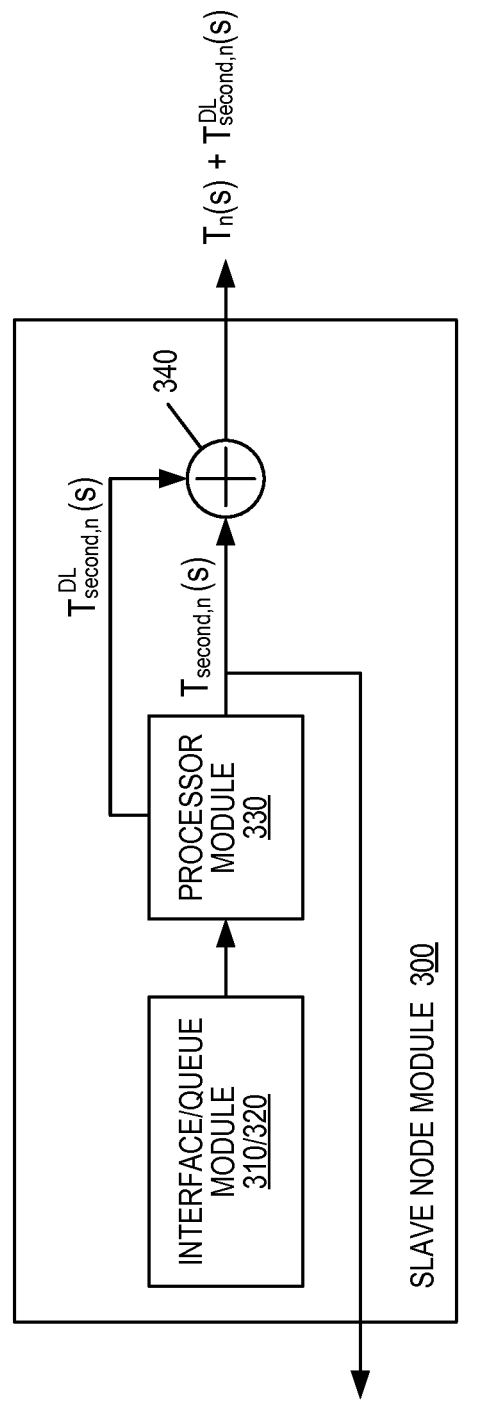
FIG. 14 shows a block diagram for an exemplary slave node module.

It will also be appreciated that in other embodiments, various elements disclosed herein comprise some kind of module configured to execute the described function. For example, the interface, combiner, outer loop controller, transmit queue, processor, combining matrix, inner loop controller and/or filter elements of the master and slave nodes 200, 300 may be implemented as, e.g., interface modules, combiner modules, outer loop controller modules, processing modules, transmit queue modules, combining matrix modules, inner loop controller modules, filter modules, etc. As such, the master node 200 may comprise a master node module 200 configured to execute the method 500 of FIG. 5, where the master node module 200 comprises an interface module 210, a first combiner module 220, an outer loop controller module 230 (comprising filter modules 232, 234, combiner modules 233, 235, and an optional decoupling module 236), and an optional second combiner module 240, as shown in FIG. 12. Similarly, the slave node(s) 300 of FIG. 7 may comprise a slave node module 300 configured to execute the method 600 of FIG. 6, where the slave node module 300 comprises an interface module 310, transmit queue module 320, processing module 330, and combining module 340, as shown in FIG. 14.

The solution presented herein provides improved multi-point control, e.g., for current 4G systems as well as future 5G systems, using interval skew timing flow control. Such control allows enhanced capacity (e.g., any number of transmission points) as well as flow control that is consistent with ultra-lean transmissions.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method implemented in a master node of controlling a transmission timing for a first slave node and a plurality of second slave nodes in a communication network, the method comprising:
    obtaining a first delay from the first slave node, said first delay representing a transmission time between the master node and the first slave node;
    for each of the plurality of second slave nodes, obtaining a second delay from the corresponding second slave node, each of said second delays representing a transmission time between the master node and the corresponding second slave node;

subtracting the obtained first delay from each of the obtained second delays to determine a skew timing for each of the second slave nodes;

determining a first reference value using a setpoint timing error;

for each of the second slave nodes, determining a second reference value using a difference between the corresponding skew timing and a reference skew timing;

controlling the first delay using the first reference value; and controlling each of the second delays using the corresponding second reference value.

2. The method of claim 1 wherein:

the first delay is derived from a combination of a first queue delay, representing the delay caused by traversing a queue in the first slave node, and a first backhaul delay for a first channel between the master node and the first slave node;

each of the second delays for the corresponding second slave node is derived from a combination of a second queue delay, representing the delay caused by traversing a queue in the corresponding second slave node, and a second backhaul delay for a second channel between the master node and the corresponding second slave node.

3. The method of claim 1 wherein determining the second reference values comprises:

generating a plurality of controller input signals, where each controller input signal comprises the difference between the corresponding skew timing and the reference skew timing; and filtering each controller input signal in a corresponding feedback control filter for a control channel of the corresponding second slave node to generate a filtered skew timing;

wherein determining the second reference values comprises determining, for each of the second slave nodes, the second reference value using the corresponding filtered skew timing.

4. The method of claim 1 further comprising:

summing the obtained first and second delays to determine a sum delay; and subtracting the sum delay from a reference sum delay to determine the setpoint timing error.

5. The method of claim 4 further comprising filtering the setpoint timing error in a feedback control filter for a delay sum channel to generate a filtered setpoint timing error, wherein determining the first reference value comprises determining the first reference value using the filtered setpoint timing error.

6. The method of claim 1 further comprising decoupling the skew timings and reference values using a decoupling matrix derived from a computation of the sum and skew timings.

7. The method of claim 6 wherein the decoupling matrix is generated according to:

$$M = \frac{1}{n}\begin{bmatrix} 1 & -1 & \cdots & \cdots & -1 \\ 1 & n-1 & -1 & \cdots & -1 \\ 1 & -1 & n-1 & \ddots & \vdots \\ \vdots & & & \ddots & -1 \\ 1 & -1 & \cdots & -1 & n-1 \end{bmatrix},$$

where M represents the decoupling matrix and n represents the number of the plurality of second slave nodes.

8. The method of claim 1 wherein:

obtaining the first delay comprises receiving a first signaling message comprising an identity number of the first slave node, a first bearer identity number, and a first information element including the first delay; and obtaining the second delays comprises receiving a second signaling message comprising an identity number of the corresponding second slave node, a second bearer identity number, and a second information element including the corresponding second delay.

9. The method of claim 8 wherein the first signaling message further comprises a first time tag for measuring another first delay, and wherein the second signaling messages each further comprise a second time tag for measuring another second delay.

10. The method of claim 1 wherein:

determining the first reference value comprises determining the first reference value using the setpoint timing error and the first backhaul delay; and determining the second reference value comprises, for each of the second slave nodes, determining the second reference value using the second backhaul delay of the corresponding second slave node and a difference between the corresponding skew timing and a reference skew timing.

11. The method of claim 1 wherein obtaining the first delay from the first slave node comprises obtaining the first delay from the first slave node via an intermediate node.

12. The method of claim 1 wherein obtaining the second delay from the corresponding second slave node comprises obtaining the second delay from at least one second slave node via an intermediate node.

13. A master node in communication with a first slave node and a plurality of second slave nodes of a communication network, the master node comprising:

an interface circuit configured to:

obtain a first delay from the first slave node, said first delay representing a transmission time between the master node and the first slave node; and for each of the plurality of second slave nodes, obtain a second delay from the corresponding second slave node, each of said second delays representing a transmission time between the master node and the corresponding second slave node;

a first combiner circuit configured to subtract the obtained first delay from each of the obtained second delays to determine a skew timing for each of the second slave nodes;

an outer loop control circuit configured to:

determine a first reference value using a setpoint timing error;

for each of the second slave nodes, determine a second reference value using a difference between the corresponding skew timing and a reference skew timing;

control the first delay using the first reference value; and control each of the second delays using the corresponding second reference value.

14. The master node of claim 13 wherein:

the first delay is derived from a combination of a first queue delay, representing the delay caused by traversing a queue in the first slave node, and a first backhaul delay for a first channel between the master node and the first slave node; and each of the second delays, for the corresponding second slave node, is derived from a combination of a second queue delay, representing the delay caused by traversing a queue in the corresponding second slave node, and a second backhaul delay for a second channel between the master node and the corresponding second slave node.

15. The master node of claim 13:
further comprising a second combiner circuit configured to generate a plurality of controller input signals by individually subtracting the skew timings from the reference skew timing;
wherein the outer loop control circuit comprises a filter circuit comprising a plurality of feedback control filters, each of the feedback control filters configured for a control channel of the corresponding second slave node and configured to filter the corresponding controller input signal to generate a filtered skew timing; and
wherein the outer loop control circuit determines the second reference values by determining, for each of the second slave nodes, the second reference value using the corresponding filtered skew timing.

16. The master node of claim 13 wherein the first combiner circuit is further configured to sum the obtained first and second delays to determine a sum delay and wherein the second combiner circuit is further configured to subtract the sum delay from a reference sum delay to determine the setpoint timing error.

17. The master node of claim 16 wherein the filter circuit further comprises a sum feedback control filter for a delay sum channel, said sum feedback control filter configured to filter the setpoint timing error to generate a filtered setpoint timing error, wherein the outer loop control circuit determines the first reference value by determining the first reference value using the filtered setpoint timing error.

18. The master node of claim 13 wherein the outer loop control circuit further comprises a decoupling matrix derived from a computation of the sum and skew timings, said decoupling matrix configured to decouple the skew timings and reference values.

19. The master node of claim 18 wherein the decoupling matrix is generated according to:

$$M = \frac{1}{n}\begin{bmatrix} 1 & -1 & \cdots & \cdots & -1 \\ 1 & n-1 & -1 & \cdots & -1 \\ 1 & -1 & n-1 & \ddots & \vdots \\ \vdots & & & \ddots & -1 \\ 1 & -1 & \cdots & -1 & n-1 \end{bmatrix},$$

where M represents the decoupling matrix and n represents the number of the plurality of second slave nodes.

20. The master node of claim 13 wherein the interface is configured to obtain the first and second delays by:
receiving a first signaling message comprising an identity number of the first slave node, a first bearer identity number, and a first information element including the first delay; and
receiving a second signaling message comprising an identity number of the corresponding second slave node, a second bearer identity number, and a second information element including the corresponding second delay.

21. The master node of claim 20 wherein the first signaling message further comprises a first time tag for measuring another first delay, and wherein the second signaling messages each further comprise a second time tag for measuring another second delay.

22. The master node of claim 13 wherein the outer loop control circuit is further configured to:
determine the first reference value using the setpoint timing error and the first backhaul delay; and
for each of the second slave nodes, determine the second reference value using the second backhaul delay of the corresponding second slave node and a difference between the corresponding skew timing and a reference skew timing.

23. The master node of claim 13, wherein the master node and at least one of the slave nodes are disposed in a base station.

24. The master node of claim 13 wherein the master node is disposed in a network node, and one or more of the plurality of slave nodes are disposed in a radio base station.

25. The master node of claim 13 wherein the interface circuit obtains the first delay from the first slave node by obtaining the first delay from the first slave node via an intermediate node.

26. The master node of claim 13 wherein the interface circuit obtains the second delay from the corresponding second slave node by obtaining the second delay from at least one second slave node via an intermediate node.

27. A computer program product stored in a non-transitory computer readable medium for controlling a master node in communication with a first slave node and a plurality of second slave nodes, the computer program product comprising software instructions which, when run on a processing circuit in the master node, causes the master node to:
obtain a first delay from the first slave node, said first delay representing a transmission time between the master node and the first slave node;
for each of the plurality of second slave nodes, obtain a second delay from the corresponding second slave node, each of said second delays representing a transmission time between the master node and the corresponding second slave node;
subtract the obtained first delay from each of the obtained second delays to determine a skew timing for each of the second slave nodes;
determine a first reference value using a setpoint timing error;
for each of the second slave nodes, determine a second reference value using a difference between the corresponding skew timing and a reference skew timing;
control the first delay using the first reference value; and
control each of the second delays using the corresponding second reference value.

28. A method implemented in a slave node in communication with a master node in a communication network, the method comprising:
receiving data with a rate set by a data rate control signal, said data rate control signal derived by the master node responsive to a reference value determined by the master node;
storing the received data in a transmit queue;
generating a backhaul delay from detected time-stamped data and the reception of said time-stamped data;
estimating a queue delay for controlling the reference value responsive to the data rate control signal, the queue delay representing the amount of time the received data is stored in the transmit queue;

combining the backhaul delay and the queue delay to generate a slave node delay; and controlling the data rate control signal by providing the queue delay to the master node via a first interface and providing the slave node delay to the master node via a second interface.

29. A slave node in communication with a master node in a communication network, the slave node comprising:

an interface circuit configured to receive data with a rate set by a data rate control signal, said data rate control signal derived by the master node responsive to a reference value determined by the master node;

a transmit queue configured to store the received data;

a processor circuit configured to:
generate a backhaul delay from detected time-stamped data and the reception of said time-stamped data; and
estimate a queue delay for controlling the reference value responsive to the data rate control signal, the queue delay representing the amount of time the received data is stored in the transmit queue; and a combiner circuit configured to combine the backhaul delay and the queue delay to generate a slave node delay;

wherein the slave node is configured to control the data rate control signal by providing the queue delay to the master node via a first interface and by providing the slave node delay to the master node via a second interface.

30. A computer program product stored in a non-transitory computer readable medium for controlling a slave node in communication with a master node, the computer program product comprising software instructions which, when run on a processing circuit in the slave node, causes the slave node to:

receive data with a rate set by a data rate control signal, said data rate control signal derived by the master node responsive to a reference value determined by the master node;

store the received data in a transmit queue;

generate a backhaul delay from detected time-stamped data and the reception of said time-stamped data;

estimate a queue delay for controlling the reference value responsive to the data rate control signal, the queue delay representing the amount of time the received data is stored in the transmit queue;

combine the backhaul delay and the queue delay to generate a slave node delay; and control the data rate control signal by providing the queue delay to the master node via a first interface and providing the slave node delay to the master node via a second interface.

* * * * *